US008306941B2

(12) United States Patent
Ma (10) Patent No.: US 8,306,941 B2
(45) Date of Patent: Nov. 6, 2012

(54) SYSTEM AND METHOD FOR IDENTIFYING TREES USING LIDAR TREE MODELS

(75) Inventor: Zhenkui Ma, Kent, WA (US)

(73) Assignee: Weyerhaeuser NR Company, Federal Way, WA (US)

(*) Notice: Subject to any disclaimer, the term of this patent is extended or adjusted under 35 U.S.C. 154(b) by 865 days.

(21) Appl. No.: 12/410,217

(22) Filed: Mar. 24, 2009

(65) Prior Publication Data

US 2010/0250482 A1 Sep. 30, 2010

(51) Int. Cl.
G06F 15/00 (2006.01)
G06F 15/18 (2006.01)
G01V 3/00 (2006.01)
G01V 7/00 (2006.01)

(52) U.S. Cl. .............................. 706/62; 702/2
(58) Field of Classification Search .................... 706/62; 702/2; 382/108
See application file for complete search history.

(56) References Cited

U.S. PATENT DOCUMENTS

| 7,046,841 | B1 | 5/2006 | Dow |
| 7,474,964 | B1 | 1/2009 | Welty |
| 2006/0061566 | A1 | 3/2006 | Werma et al. |
| 2006/0136126 | A1 | 6/2006 | Coombes et al. |
| 2008/0319673 | A1 | 12/2008 | Welty et al. |

OTHER PUBLICATIONS

T. Brandtberg, "Classifying individual tree species under leaf-off and leaf-on conditions using airborne lidar", ISPRS J. of Protogrammetry & Remote Sensing 61 (2007), pp. 325-340, available online Nov. 28, 2006.*

G. Vosselman et al., "Recognising structure in laser scanner point clouds", International Archives of Photogrammetry, Remote Sensing and Spatial Information Sciences, vol. 46, No. 8, pp. 33-38, 2004.*
J. Holmgren and A. Persson, "Identifying Species of Individual Trees Using Airborn Laser Scanner", Remote Sensing of Environment, col. 90, pp. 415-423, 2004.*
David, N., et al., "Library Concept and Design for LiDAR Data Processing," <http://209.85.173.132/search?q=cache: mwO-LEHIfpkJ:www.isprs.org/commission4/geobia2008/Sessions/Session2/6703_David_Proc.pdf> [retrieved Jan. 7, 2009], 6 pages, Available Aug. 5-8, 2008.
Kim, S., "Individual Tree Species Identification Using LIDAR-Derived Crown Structures and Intensity Data," doctoral dissertation, University of Washington, 2007, 137 pages.
Orka, H.O., et al., "Utilizing Airborne Laser Intensity for Tree Species Classification," Proceedings of the ISPRS Workshop on Laser Scanning 2007 and SilviLaser 2007, Sep. 12-14, 2007, Finland, International Archives of Photogrammetry, Remote Sensing and Spatial Information Sciences XXXVI (Part 3/W52), pp. 300-304.
Packalen, Petteri, "Using Airborne Laser Scanning Data and Digital Aerial Photographs to Estimate Grwoing Stock by Tree Species," University of Joensuu, 2009 (41 pgs.).

* cited by examiner

Primary Examiner — Kakali Chaki
Assistant Examiner — Vincent Gonzales
(74) Attorney, Agent, or Firm — Perkins Coie LLP (57) ABSTRACT

A computer system creates and stores a library of LiDAR models for standard trees that have measured characteristics. A point cloud of LiDAR data from an unidentified tree in a forest is compared against a point cloud defined by a LiDAR model of a standard tree in the library to find a match. If a match is found, one or more characteristics of the matching standard tree are associated with the unidentified tree.

15 Claims, 8 Drawing Sheets

UNIDENTIFIED LiDAR DATA

*Fig. 7A.*

LiDAR MODEL DATA

SYSTEM AND METHOD FOR IDENTIFYING TREES USING LIDAR TREE MODELS

FIELD

The disclosed technology relates generally to systems and methods for remote sensing of forest lands and in particular, to systems and methods for characterizing individual trees in LiDAR data.

BACKGROUND

In forest management, having an accurate inventory of trees in a forest is important to be able to manage forest lands effectively. Forest managers use inventory data to determine when it is time to harvest trees in a forest as well as for determining the value of such trees depending on market conditions. In the past, survey crews would be sent into a forest to do statistical sampling of tree heights, species and diameters. From the samples collected, an estimate of timber volume and value can be determined. As the size of forests under active management increase and/or more remote areas are actively managed, it is becoming cost prohibitive and impractical to send crews into enough places in the forest to obtain good sample data. More recent technology for sampling involves the use of remotely obtained data such as aerial or satellite images. While remotely sensed images can be used to determine tree species and ages for tree stands (i.e. groups of homogenous trees), it is time consuming to get information about individual trees in a forest from remotely sensed images even if images with fine resolution provide such information.

A newer technology that can be used to remotely sample individual trees in a forest is Light Detection and Ranging (LiDAR). With LiDAR, an airplane, helicopter or other relatively low flying aircraft is used to direct laser pulses towards the ground in a repetitive sweeping pattern. The laser pulses are reflected off the trees, ground or other objects back to a detector on the aircraft. The time of receipt, direction and the intensity of each received pulse is recorded. Because the height and location of the aircraft are known, a three dimensional map of the forest land surveyed with the LiDAR system can be produced.

With LiDAR sampling, there is a lot of data available to be able to determine such information as tree heights and canopy widths. However, there is a need for a system and method of analyzing the LiDAR data to be able to identify additional characteristics about individual trees in the forest such as their species, approximate age, branch structure or other factors that are important in determining a value or other the information about the trees.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

To address the above mentioned problems and others, the technology disclosed relates to a system for analyzing LiDAR data to identify characteristics of individual trees within a forest. In one embodiment, a computer system stores a library of LiDAR models that define point clouds for a number of ground truthed or physically inspected standard trees. LiDAR point cloud data obtained from unidentified trees in a forest are compared against the point clouds of the LiDAR models for the standard trees in the library. The LiDAR models for the standard trees may store tree characteristics such as the tree species, age, trunk diameter, a characterization of branch structure, wood stiffness etc. If the a point cloud of LiDAR data for an unidentified tree matches a point cloud of a LiDAR model in the library, the characteristics of the standard tree associated with the matching LiDAR model are attributed to the unidentified tree.

In one embodiment, combined LiDAR data from a group of trees in a forest is searched to extract the LiDAR samples reflected from a selected standard tree. A computer system searches the LiDAR data for peaks. Upon detection of a peak, the computer searches the LiDAR data radially outwards from the peak to detect an edge of a canopy for a tree. Those sample points within a boundary of the canopy form a point cloud that is stored in LiDAR model for the standard tree in the library. Other attributes or characteristics for the standard tree represented by the LiDAR model are stored in the library after physical inspection of the tree.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
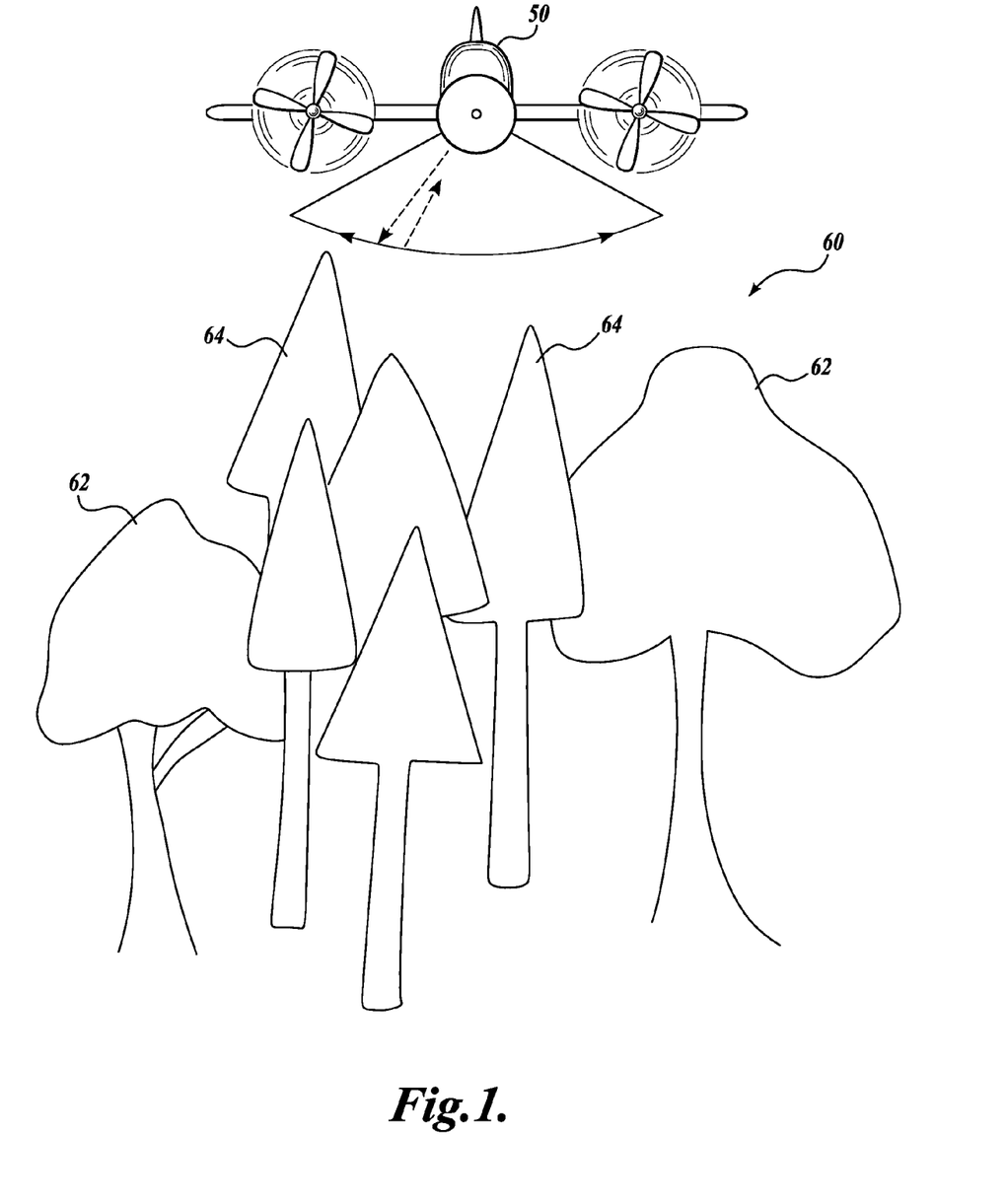
FIG. 1 illustrates a LiDAR imaging system used to survey a forest.

FIG. 1 illustrates a basic LiDAR sampling system used to survey forest lands. In the example shown, an airplane 50 carries a LiDAR transmitting and receiving unit over a forest 60. The trees in the forest 60 may include a mixture of hardwoods 62 and conifers 64. Alternatively, the trees in the forest can be all similar species such as all hardwoods or all conifers.

As will be appreciated by those of ordinary skill in the remote sensing arts, the LiDAR system carried by the airplane 50 directs a number of laser pulses towards the trees in a repeating pattern. In one embodiment, the laser pulses are sent at approximately 150K pulses/sec. and the reflected pulses are sampled up to four times between transmitted pulses. A computer associated with the LiDAR system keeps a record of the time at which each laser pulse is transmitted along with a record of the time and intensity at which reflected pulses are detected. The height and speed at which the airplane 50 is flying and GPS data for the airplane position are stored in the LiDAR computer so that the height and location of each object that reflects a laser pulse can be determined. The airplane 50 flies a number overlapping paths over the forest 60 to collect LiDAR data from substantially each tree in the forest 60.

To be able to estimate the value of the timber in the forest, a forest manager generally needs to know the number and type of each tree in the forest, their heights, diameters and their ages. In addition, other characteristics such as if the trees have many fine branches (more valuable) or fewer, larger branches (less valuable) is useful, since it is related to the specific gravity of a tree or how stiff the wood is.

To provide quantitative data regarding the individual trees in a forest, the technology disclosed herein compares LiDAR data obtained from unidentified trees in a forest against a library of LiDAR models stored for various "standard" trees. The standard trees can be selected by species, age, branch pattern or other factors. Upon finding a match between the LiDAR data and a LiDAR model associated with a particular standard tree, the characteristics stored in the library for the standard tree are attributed to the tree associated with the matching LiDAR data.

Figure 2:
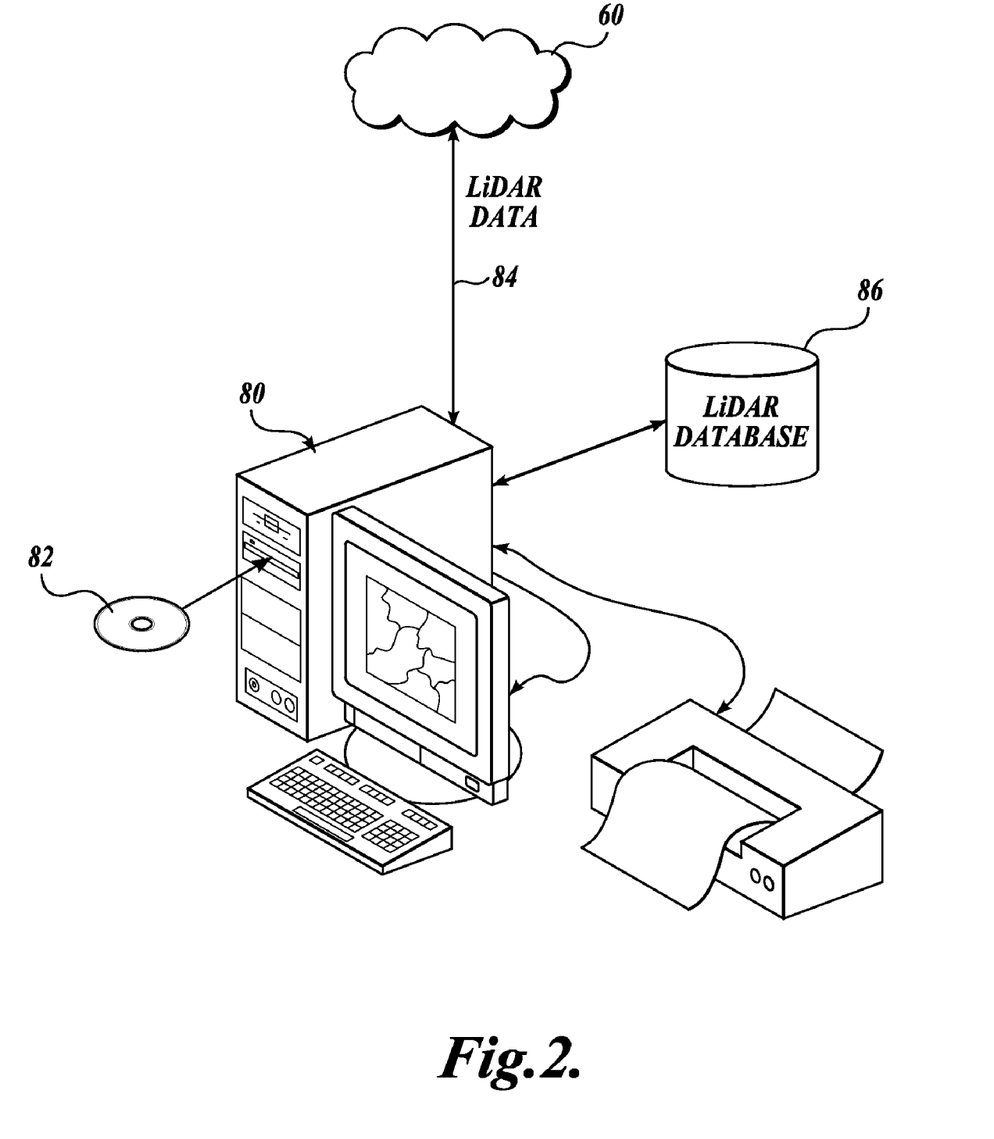
FIG. 2 illustrates a representative computer system that analyzes LiDAR data to create a library of LiDAR models of standard trees and/or to use the library to identify unidentified trees within a forest in accordance with an embodiment of the disclosed technology.

FIG. 2 shows a representative computer system that can be used to analyze LiDAR data to create a library of LiDAR models for selected standard trees in a forest. The stand-alone, networked, or distributed computer 80 includes one or more processors (not shown) that execute a sequence of programmed instructions. The instructions may be stored on computer readable storage media such as a CD ROM 82, DVD, hard drive, flash memory or the like. Alternatively, the instructions may be received over a wired or wireless communication link 84 that may connect to the Internet. Upon executing the instructions, the computer generates and maintains a library 86 of LiDAR models stored for selected standard trees that have been "ground truthed" or physically inspected by an individual to verify their species, height and age. In addition, data stored in the LiDAR model for a standard tree may include some characterization of its branch structure, its diameter, wood stiffness or other characteristics that affect the value of the tree or provides information useful to a forester.

Once the library 86 of LiDAR models is created for the standard trees and stored in a database or in some other computer readable format, the computer system 80 can use the library to compare to LiDAR data from unclassified or unidentified trees in a forest. The LiDAR data from an unidentified forest may be recorded on a computer readable storage medium e.g. DVD, CD-ROM, hard disk etc. or downloaded over the wired or wireless communication link. As will be explained in further detail below, the computer 80 analyzes the LiDAR data from the forest to extract a point cloud that contains most, if not all, the points reflected from an individual unidentified tree. The extracted point cloud is then compared against point clouds stored in the LiDAR models for the standard trees in the LiDAR library 86 to see if there is a match. If a match is found (within some margin of error) then the characteristics of the matching standard tree are attributed to the unidentified tree. From the total number of point clouds found that match a LiDAR model of a standard tree, a forester can estimate the value of the individual trees in a forest or perform some other calculation related to the forest health, timber volume etc.

Figure 3:
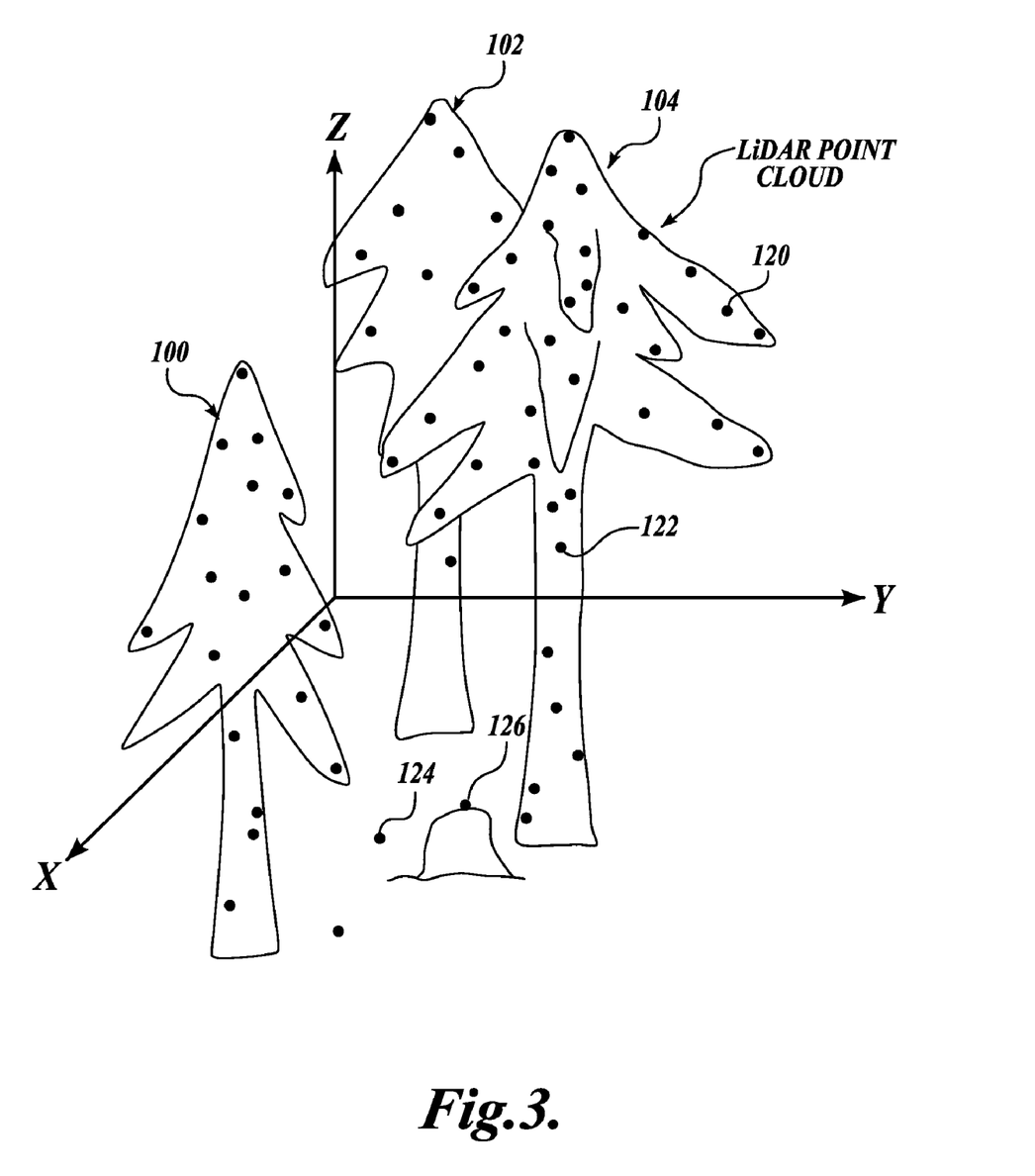
FIG. 3 illustrates three LiDAR point clouds representing trees in a forest.

FIG. 3 illustrates LiDAR point clouds associated with three trees 100, 102 and 104. Each LiDAR data point is reflected from some portion of the tree such as the canopy 120, the trunk 122, branches etc. The LiDAR data may also include data points that are caused by reflections from the ground 124 or from rocks 126, birds, telephone or power lines etc. When raw LiDAR data is received, there is no demarcation indicating which points were reflected from an individual tree versus those that were reflected from an adjacent tree or from other objects.

In one embodiment of the disclosed technology, LiDAR data points reflected from a single tree are identified by the computer system by first analyzing the three-dimensional LiDAR data to locate peaks. It is assumed that each peak in the LiDAR data represents the crown or apex of a tree. In one embodiment, unusually high peaks compared with the average height of the peaks found are ignored as possibly being reflected from a bird other non-tree object.

Figure 4:
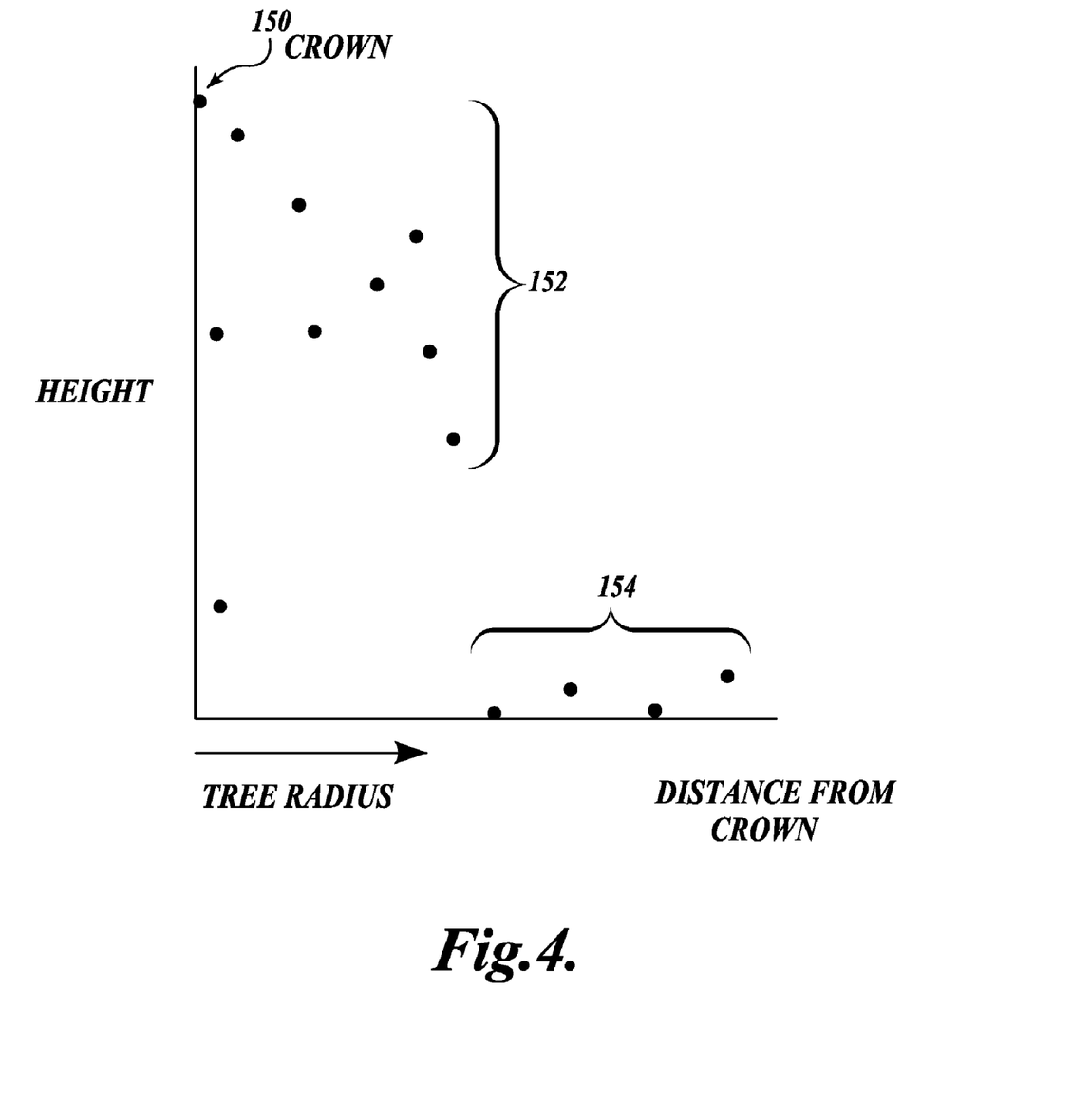
FIG. 4 illustrates a cross section of LiDAR data points extending radially outwards from a crown of a tree.

As shown in FIG. 4, the computer system searches the LiDAR data for a peak reflection point representing a tree crown 150. Once a crown is found, the computer begins searching radially outward for a sustained drop in the LiDAR data point height. In the example shown, a group of data points 152 generally decreases in height with radial distance away from the crown 150 as might be expected in a tree canopy. At a point further radially outward, the data points 154 drop and remain generally lower such as at ground level or may begin to rise such as might be expected from the presence of an adjacent canopy. The point at which the points drop in height or begin to rise in height marks the boundary of a canopy for an individual tree. In one embodiment, each LiDAR data point within the boundary of the canopy is selected to be part of a point cloud that defines the LiDAR model for that particular tree. In the example shown in FIG. 4, the search is shown only in one direction from the crown 150. In one embodiment, searches are performed extending 360 degrees around the crown to locate the boundaries of the canopy. In another embodiment, the edge of the canopy found by searching radially outward in one direction can be used to define the canopy boundary for the entire tree.

Figure 5:
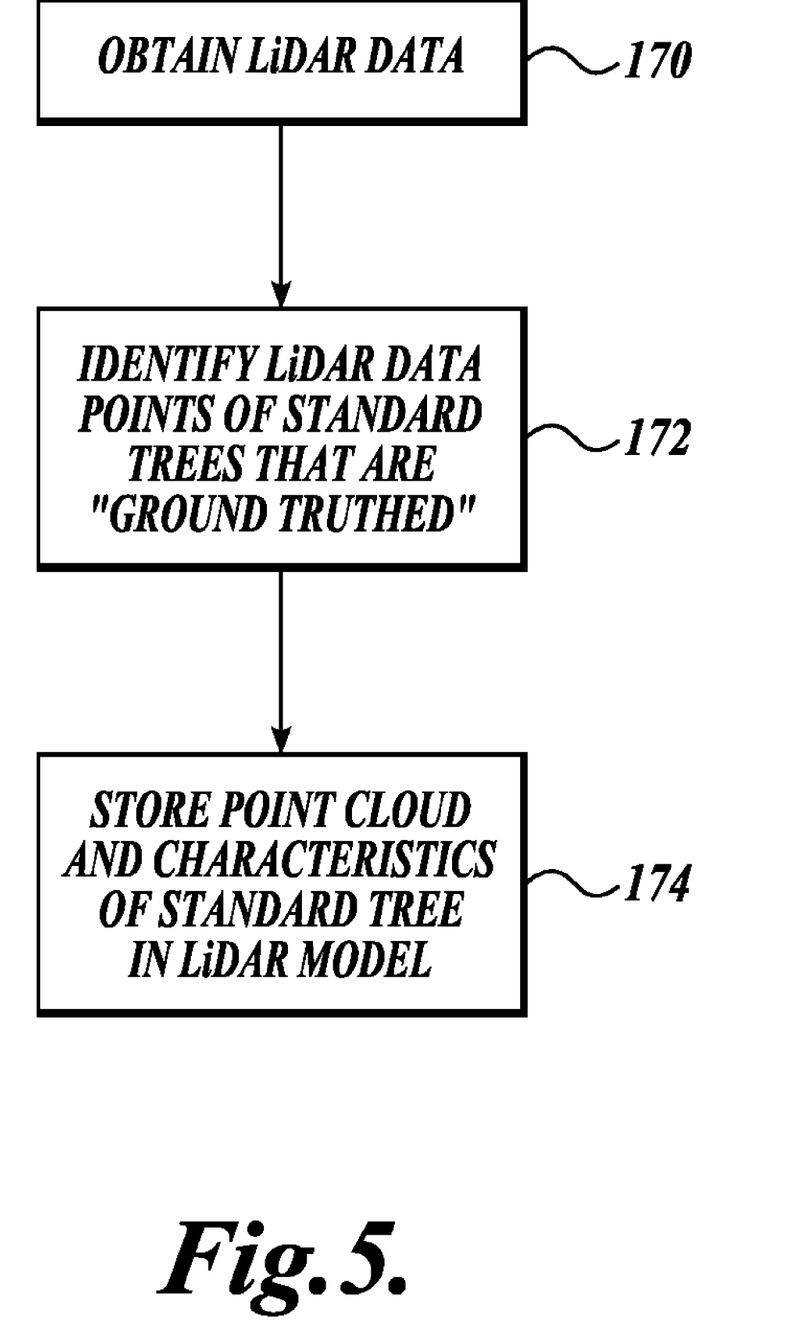
FIG. 5 is a flowchart of steps performed by a computer system to create a library of LiDAR models for standard trees.

FIG. 5 illustrates a series of steps performed by the computer system to create the library of LiDAR models for standard trees. Beginning at 170, the computer obtains LiDAR data from air surveying a forest. At 172, the LiDAR data points associated with a standard tree are obtained. Standard trees are those selected by an individual as fairly representing a group of trees in a forest area. For example, if the forest area contains 25 year old, closely-spaced, Douglas Fir trees then a forester would select one of the trees as being representative of such group. One or more characteristics of the selected tree such as its species, height, canopy width, age, trunk diameter, branch structure are recorded along with its location. In addition, the representative tree might be cut down to examine its wood quality or other factors. Given the location of the tree, the computer searches the LiDAR data to find the corresponding set of LiDAR data points that were reflected off the standard tree and isolates the data points using the method described in connection with FIG. 4 or with some other method. Once a point cloud for the standard tree has been isolated, a LiDAR model is defined for the tree that includes the point cloud along with data regarding one or more of the verified tree characteristics i.e. species, height, age, canopy width etc. at 174. In one embodiment, the point cloud is stored in the library using the conventional LiDAR .las format along with alphanumeric entries for the ground truthed, i.e. measured or confirmed, characteristics for the standard tree.

There may be many different LiDAR models stored in the library for each type of tree in the forest. For example, some trees in an area may be closely spaced while others are growing farther apart. Similarly, some trees may be finely branched or more coarsely branched. Standard trees representing all types may be selected and LiDAR model entries added to the library for each type of tree.

Figure 6:
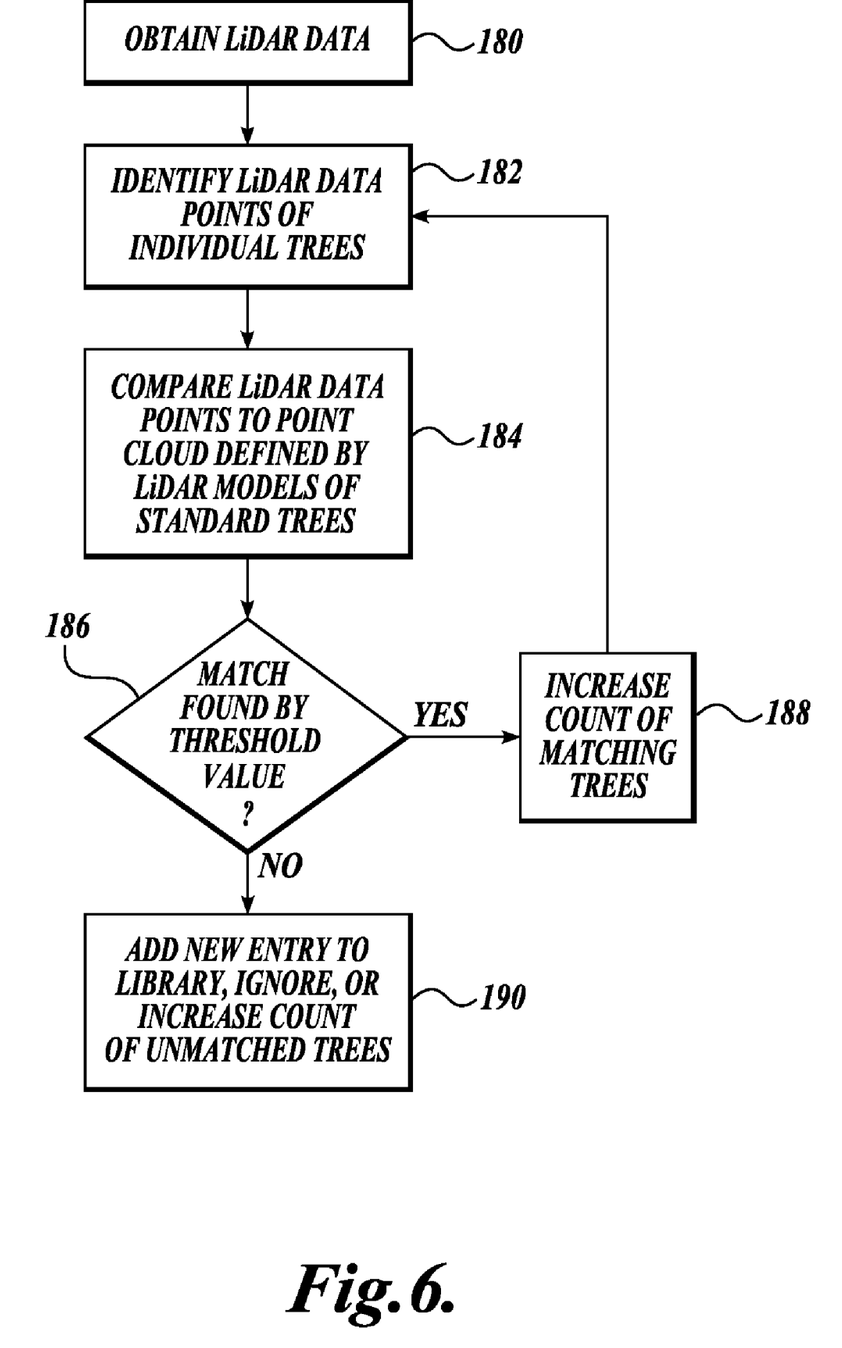
FIG. 6 is a flowchart of steps performed by a computer system to match LiDAR data to a LiDAR model in accordance with an embodiment of the disclosed technology.

Once the library of LiDAR models for the standard trees has been created, LiDAR data from unidentified trees in a forest can be compared against the library. FIG. 6 shows steps performed by a computer in accordance with one embodiment of the disclosed technology to compare the LiDAR data from a forest against the LiDAR models in the library. Beginning at 180, the computer obtains LiDAR data from a forest area. The LiDAR data may be read from a computer readable storage media or downloaded from a remote site using a wired or wireless communication link. At 182, the computer identifies the LiDAR data points associated with individual trees using the techniques described above. At 184, the computer compares the point cloud associated with an individual tree with those point clouds stored in the LiDAR models for the standard trees in the library. At 186, it is determined if the point cloud for the tree in question matches a point cloud of LiDAR model within some threshold value. If so, then the characteristics or attributes of the matching standard tree are associated with the unidentified tree in question. If an inventory is being performed, a count of trees matching the standard tree is increased by one and the LiDAR data for the next unidentified tree in the forest can be analyzed.

If the LiDAR data for the unidentified tree in question does not match a point cloud defined by a LiDAR model of a standard tree in the library, then the computer may perform one or more different actions including increasing the count of an unidentified tree type, ignoring the LiDAR data or adding a new LiDAR model to the library. The latter step is preferably performed only after physical inspection of the tree in question to verify the attributes or characteristics of the tree.

Once all the LiDAR data for the forest has been analyzed, the result is a count of how many trees match the LiDAR models in the library. From the count, an inventory of the forest can be made and the value of the timber determined. In other situations, the comparison against LiDAR models in the library may be performed for other purposes such as to monitor the growth of the trees in the forest or to schedule harvesting, replanting etc.

Figure 7A:
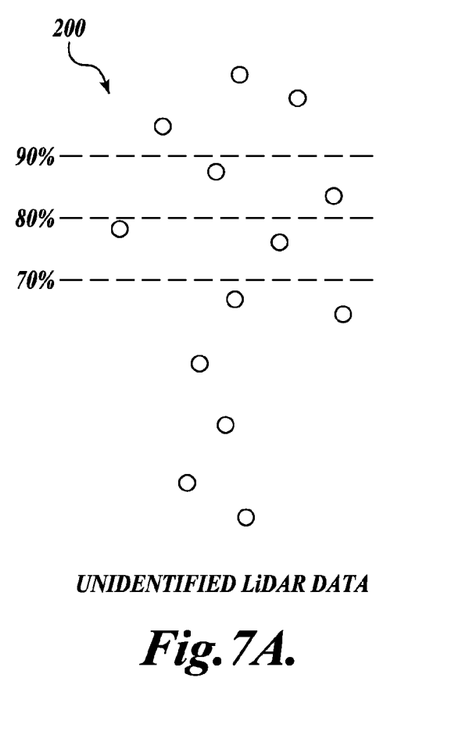
FIGS. 7A-7D illustrate different techniques for comparing a LiDAR point cloud of an unidentified tree with a point cloud of a LiDAR model in accordance with the embodiments of the disclosed technology.
Figure 7B:
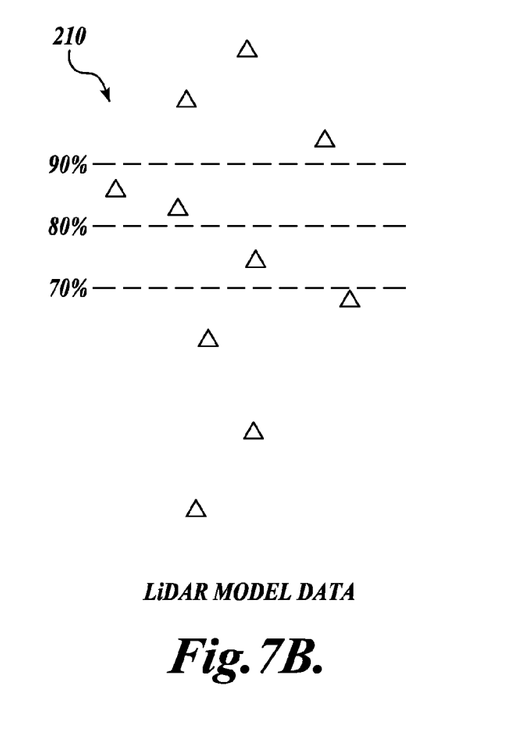

FIGS. 7A-7D illustrate two different techniques for comparing LiDAR data for an unidentified tree with a point cloud defined by the LiDAR model for a standard tree. FIG. 7A illustrates a point cloud 200 of LiDAR data points for an unidentified tree in a forest. FIG. 7B illustrates a point cloud 210 of a LiDAR model stored for a standard tree in the library. In one embodiment, the computer tries to determine if the point cloud 200 and the point cloud 210 stored in the library are similar enough to qualify as a match. In one embodiment, the height of the tree associated with the point cloud 200 is known from the height of the highest LiDAR data point in the point cloud 200. In addition, the width of the canopy represented by the point cloud 200 can also be determined in the manner described above in connection with FIG. 4. The computer then searches the library for LiDAR models having generally the same height and canopy width to compare against. As will be appreciated by those skilled in the art, the heights and canopy widths of the selected LiDAR models need not be exactly the same as the unidentified tree but may for example, be within some threshold value like 10%.

Next, a comparison is made to determine the similarity between the point cloud 200 of the unidentified tree and the point clouds defined by the LiDAR models selected from the library. In one embodiment, the similarity is determined by checking to see if the number of LiDAR data points from each percentile of tree height in both the point cloud of the unidentified tree and the point clouds of the LiDAR models are the same. In the example shown, both point clouds 200 and 210 have three LiDAR data points at a height between 90-100% of the maximum tree height. Both point clouds have two LiDAR data points at a height between 80-90% of the maximum tree height etc.

Figure 7C:
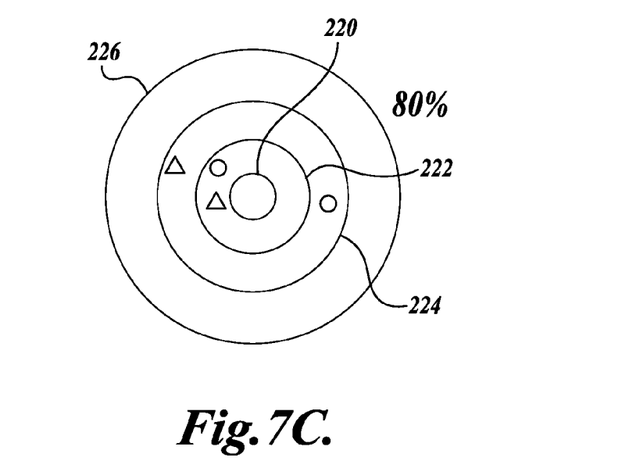

In addition to comparing the distribution of data points as a function of the height of the tree, the computer can also measure a similarity of the distribution of data points as a function of the distance from the center of the tree and the edge of the canopy. As shown in FIG. 7C, each percentile, or some other slice, of tree crown width can be sub-divided into a number of concentric rings 220, 222, 224, 226 etc. extending from the center of the tree. The computer can determine if each point cloud has the same or similar number of LiDAR data points in each ring. In the example shown, both the point cloud 200 and the point cloud 210 each have one data point in the area between rings 220 and 222 and each have one data point in the area between rings 222 and 224. From a comparison of the data points as a function of height and/or radial position, a determination can be made if the tree associated with the point cloud 200 is similar to the tree that is associated with the point cloud 210.

Figure 7D:
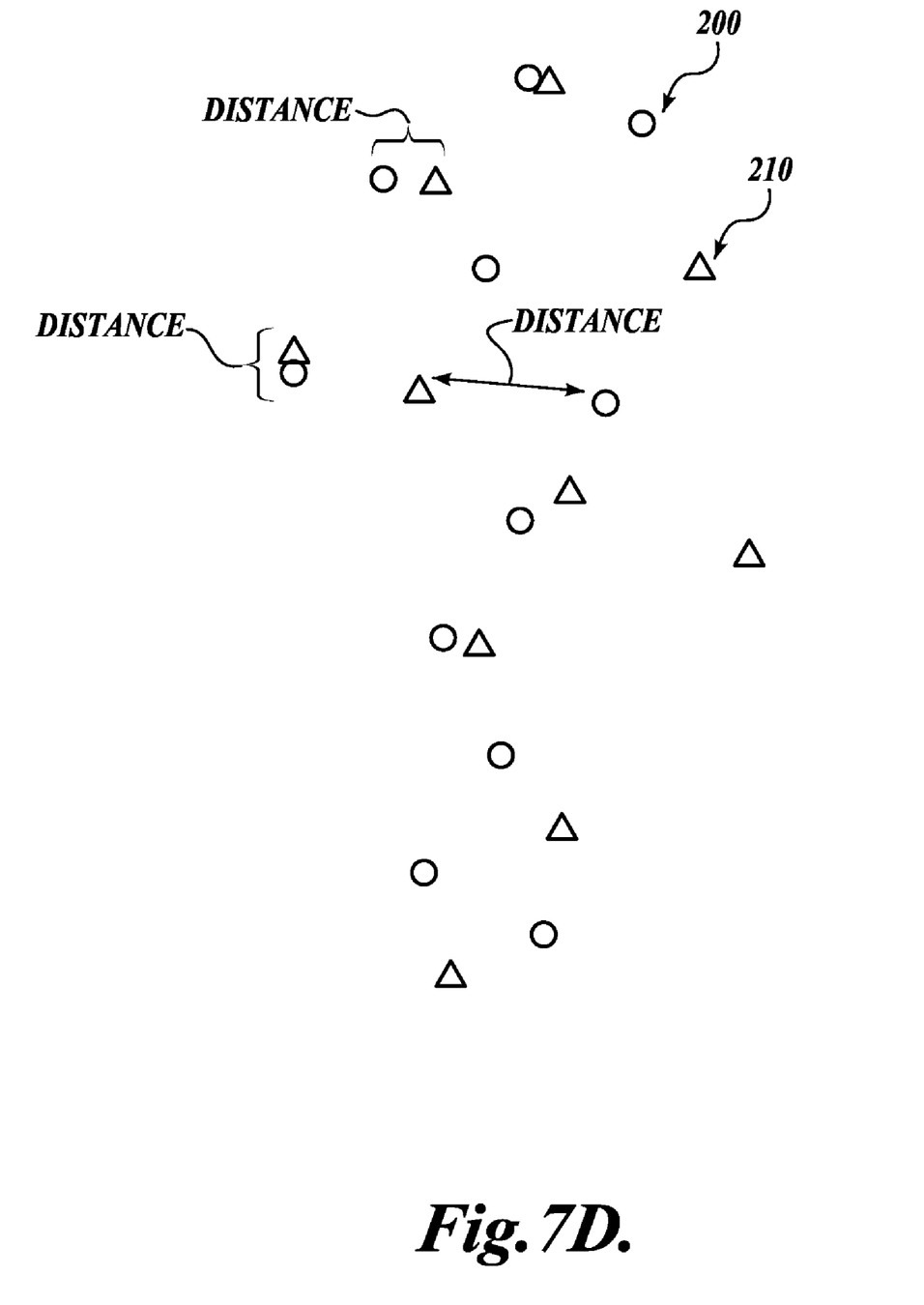

As an alternative to comparing the heights and/or radial positions of the LiDAR data points in the point clouds, the Euclidean distance between LiDAR data points can also be determined and summed. Similar point clouds having LiDAR data points in approximately the same location will have a smaller sum than those that are not as similar. As shown in FIG. 7D, the LiDAR data points in the point cloud 200 (shown as circles) and the LiDAR data points of the point cloud 210 (shown as triangles) can be compared by determining the three-dimensional distance between each data point and its closest neighbor in the other point cloud. The distances are summed and the point cloud defined by the LiDAR model in the library that produces the lowest sum represents the best match to the point cloud for the unidentified tree in question. One or more attributes or characteristics of the standard tree for the matching LiDAR model may then be associated with the tree in question.

As will be appreciated by those skilled in the art, the comparison of LiDAR data for a tree against a library of LiDAR models associated with standard trees provides a forester, forest manager, or other individual with more information about individual trees in the forest. Therefore more accurate information about the trees in the forest can be obtained.

While illustrative embodiments have been illustrated and described, it will be appreciated that various changes can be made therein without departing from the scope of the invention. For example, although the computer system described is used to both create and use the library of LiDAR models, it will be appreciated that the LiDAR model library could be created by one computer and used by another. The LiDAR model library may be made available on a web server for access by one or more remote computers by a wired or wireless communication link. Alternatively, the library of LiDAR models could be distributed on a computer readable media for use by other computers. It is therefore intended that the scope of the invention be determined from the following claims and equivalents thereof.

The embodiments of the invention in which an exclusive property or privilege is claimed are defined as follows:

1. A computer system, comprising:
    a processor that is configured to execute a sequence of programmed instructions that cause the processor to:
        read LiDAR data obtained from unidentified trees in a forest;

select a LiDAR point cloud for an unidentified tree in the forest;

compare data points in the selected LiDAR point cloud for the unidentified tree to data points in a point cloud defined in a library of LiDAR models for a number of standard trees;

determine a similarity between the data points in the LiDAR point cloud for the unidentified tree and the data points in a point cloud defined by a LiDAR model for a standard tree, and to associate one or more characteristics stored in the LiDAR model for the standard tree with the unidentified tree based on the similarity.

2. The computer system of claim 1, wherein the instructions cause the processor to determine a similarity between the data points in the point cloud for the unidentified tree and the data points in the point cloud defined by a LiDAR model for a standard tree by comparing a distribution of LiDAR data points in the point clouds versus a height of the unidentified tree and the standard tree.

3. The computer system of claim 1, wherein the instructions cause the processor to determine a similarity between the data points in the point cloud for the unidentified tree and the data points in the point cloud defined by a LiDAR model for a standard tree by comparing a distribution of LiDAR data points in the point clouds versus a radial distance from a center of the unidentified tree and the standard tree.

4. The computer system of claim 1, wherein the instructions cause the processor to determine a similarity between the data points in the point cloud for the unidentified tree and the data points in a point cloud defined by a LiDAR model for a standard tree by determining a distance between the LiDAR data points in the point cloud of the unidentified tree and the closest LiDAR data points of the point cloud defined by the LiDAR model for the standard tree.

5. The computer system of claim 1, wherein the characteristics include a tree species.

6. The computer system of claim 1, wherein the characteristics include a trunk diameter.

7. The computer system of claim 1, wherein the characteristics include a characterization of branch structure.

8. The computer system of claim 1, wherein the characteristics include a canopy width.

9. The computer system of claim 1, wherein the characteristics include wood stiffness.

10. A non-transitory computer readable medium containing instructions that are executable by a processor to:

read LiDAR data obtained from unidentified trees in a forest;

select a LiDAR point cloud for an unidentified tree in the forest;

compare data points in the selected LiDAR point cloud for the unidentified tree to data points in a point cloud defined in a library of LiDAR models for a number of standard trees;

determine a similarity between the data points in the LiDAR point cloud for the unidentified tree and the data points in a point cloud defined by a LiDAR model for a standard tree, and to associate one or more characteristics stored in the LiDAR model for the standard tree with the unidentified tree based on the similarity.

11. The non-transitory computer readable medium of claim 10, wherein the characteristics stored in a library model for a standard tree include a tree species.

12. The non-transitory computer readable medium of claim 10, wherein the characteristics stored in a library model for a standard tree include a trunk diameter.

13. The non-transitory computer readable medium of claim 10, wherein the characteristics stored in a library model for a standard tree include a characterization of branch structure.

14. The non-transitory computer readable medium of claim 10, wherein the characteristics stored in a library model for a standard tree include a canopy width.

15. The non-transitory computer readable medium of claim 10, wherein the characteristics stored in a library model for a standard tree include a wood stiffness.

* * * * *